United States Patent
Park et al.

(10) Patent No.: US 8,549,115 B2
(45) Date of Patent: Oct. 1, 2013

(54) APPARATUS AND METHOD FOR UPGRADING FIRMWARE ON INTERNET SHARING DEVICE

(75) Inventors: Se-Dong Park, Seoul (KR); Uk-Jin Kim, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 12/378,886

(22) Filed: Feb. 20, 2009

(65) Prior Publication Data
US 2009/0260001 A1   Oct. 15, 2009

(30) Foreign Application Priority Data
Feb. 22, 2008 (KR) .................. 10-2008-0016507

(51) Int. Cl.
*G06F 15/177* (2006.01)
*G06F 9/44* (2006.01)

(52) U.S. Cl.
USPC ............................ 709/221; 717/168; 709/223

(58) Field of Classification Search
USPC ................... 709/221, 223; 717/168–173
See application file for complete search history.

(56) References Cited

U.S. PATENT DOCUMENTS

| | | | |
|---|---|---|---|
| 2002/0107922 A1* | 8/2002 | Nakamura et al. | 709/205 |
| 2003/0018752 A1* | 1/2003 | Lowy | 709/219 |
| 2003/0208687 A1* | 11/2003 | Liang et al. | 713/200 |
| 2005/0080899 A1* | 4/2005 | Vogel et al. | 709/225 |
| 2006/0109505 A1* | 5/2006 | Ha et al. | 358/1.15 |
| 2007/0292147 A1* | 12/2007 | Sugiura | 399/12 |

* cited by examiner

*Primary Examiner* — Jeong S Park

(57) ABSTRACT

An apparatus and method for upgrading firmware on an internet sharing device. The apparatus includes a memory that stores information for getting access to a firmware server, a lookup part that gets access to the firmware server and looks up a new version of firmware using the information stored in the memory, and an upgrade notice part that gives notice of firmware upgrade to at least one terminal interworking with the internet sharing device when the new version of firmware is looked up. Thus, since the internet sharing device looks up a new version of firmware, and then automatically gives notice of a need for firmware upgrade to a user, the user can easily recognize whether or not the firmware upgrade is needed, and easily upgrade the firmware with no need to check a kind of the internet sharing device, a version of firmware, location of the firmware server, and the like.

20 Claims, 4 Drawing Sheets

APPARATUS AND METHOD FOR UPGRADING FIRMWARE ON INTERNET SHARING DEVICE

CROSS-REFERENCE TO RELATED APPLICATION(S) AND CLAIM OF PRIORITY

The present application claims the benefit under 35 U.S.C. §119 (a) of a Korean patent application filed in the Korean Intellectual Property Office on Feb. 22, 2008, and there duly assigned Serial No. 2008-16507, the entire disclosure of which is hereby incorporated by reference.

TECHNICAL FIELD OF THE INVENTION

The present invention relates to an apparatus and method for upgrading firmware on an internet sharing device and, more particularly, to an apparatus and method for upgrading firmware on an internet sharing device, in which the internet sharing device automatically looks up a new version of firmware, gives notice of its result to a user, and upgrades the new version of firmware.

BACKGROUND OF THE INVENTION

Without upgrading firmware for a long time, internet sharing devices may generally cause either security troubles that have not been yet complemented or difficulty in interworking with most advanced technologies. As such, a user has to perform firmware upgrades on the internet sharing devices by periods.

However, the firmware upgrades for the internet sharing devices are carried out in such a manner that a user directly checks kinds of the sharing devices and versions of the firmware, manually gets access to websites of corresponding manufacturers through his/her own computer, and manually downloads and installs necessary programs. As such, the procedure for the upgrades is very troublesome and complicated.

Moreover, since it is not easy for ordinary users to check kinds of their own sharing devices and versions of the firmware, it is very difficult to perform all the procedures for finding out manufacturers of the internet sharing devices, navigating websites, looking up proper versions of firmware, and installing the firmware.

Further, most users do not easily recognize a need for the firmware upgrade because the internet sharing devices are not directly used unlike computers.

Accordingly, the internet sharing devices distributed to most households have old versions of firmware so that communication problems, such as retardation of the Internet, frequent disconnection of network, etc., are often generated.

SUMMARY OF THE INVENTION

To address the above-discussed deficiencies of the prior art, it is a primary object to provide an apparatus and method for upgrading firmware on an internet sharing device, in which the internet sharing device looks up a new version of firmware, and gives notice of a need for firmware upgrade to a user.

Further, the present invention provides an apparatus and method for upgrading firmware on an internet sharing device, in which the internet sharing device directly downloads and installs a new version of firmware.

According to an aspect of the invention, there is provided an apparatus for upgrading firmware on an internet sharing device. The apparatus may include a memory for storing information for getting access to a firmware server, a lookup part for getting access to the firmware server, and looking up a new version of firmware using the information stored in the memory, and an upgrade notice part for giving notice of firmware upgrade to at least one terminal interworking with the internet sharing device when the new version of firmware is looked up.

The apparatus further includes a firmware installation part for downloading and installing the new version of firmware from the firmware server when the firmware upgrade is requested by the terminal.

The upgrade notice part includes a detector for detecting the terminal attempting to access internet among the currently interworking terminals, and a redirector for redirecting, when the terminal is detected by the detector, a webpage giving notice of the firmware upgrade to an internet access page of the detected terminal.

The detector further detects whether or not the detected terminal is a terminal for a manager.

The redirector displays the information about the new version of firmware, which is currently provided by the firmware server, on the webpage.

The firmware installation part includes a determiner for determining whether or not the firmware upgrade is requested by the terminal having notice of the firmware upgrade, and an installer for downloading and installing the new version of firmware from the firmware server when it is determined by the determiner that the firmware upgrade is requested.

The installer gives notice of the information about the new version of firmware downloaded to the terminal, and then receives an instruction to install the new version of firmware from the terminal.

According to another aspect of the invention, there is provided a method for upgrading firmware on an internet sharing device, the method includes getting access to a firmware server providing a new version of firmware. The method further includes looking up whether or not the new version of firmware exists. The method also includes giving notice of firmware upgrade to at least one terminal interworking with the internet sharing device when the new version of firmware exists, and downloading and installing the new version of firmware from the firmware server depending on whether or not the firmware upgrade is requested by the terminal.

The giving of notice of firmware upgrade includes detecting whether or not a user is attempting to access the Internet from among the interworking terminals exists, and redirecting a webpage to give notice of the firmware upgrade to an internet access page of the detected terminal when it is detected that the user is attempting to access the Internet from among the interworking terminals exists.

The detecting further includes detecting whether or not the detected terminal has authority as a manager.

The redirecting includes displaying information about the new version of firmware, which is provided by the current firmware server, on the webpage while redirecting a webpage giving notice of the firmware upgrade to an internet access page of the detected terminal.

The installing of the new version of firmware includes determining, through the redirected webpage, whether or not the firmware upgrade is requested. The installing of the new version of firmware further includes getting access to the firmware server to download the new version of firmware when it is determined that the firmware upgrade is requested. The installing of the new version of firmware also includes installing the downloaded firmware to reboot the internet sharing device.

The installing of the downloaded firmware includes displaying information about the downloaded firmware to receive an instruction to install the firmware.

According to embodiments of the present invention, since the internet sharing device looks up a new version of firmware and then automatically gives notice of a need for firmware upgrade to a user, the user can easily recognize whether or not the firmware upgrade is needed. Therefore he/she will not be greatly worried over the firmware upgrade for the internet sharing device.

Further, since the internet sharing device automatically gets access to a firmware server and then looks up and downloads a new version of firmware, it is not necessary for the user to find out where the firmware server for his/her internet sharing device is located. It is also not necessary for the user to find out which version the firmware that the internet sharing device currently has. Further it is not necessary for the user to manually get access to the corresponding firmware server.

Also, since the internet sharing device downloads a new version of firmware, no load is applied to performance of the computer of a user.

In addition, since the internet sharing device can be rapidly upgraded, the problems occurring on the network are reduced, and thus network service providers can reduce costs required for coping with the failures.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer network.

Figure 1:
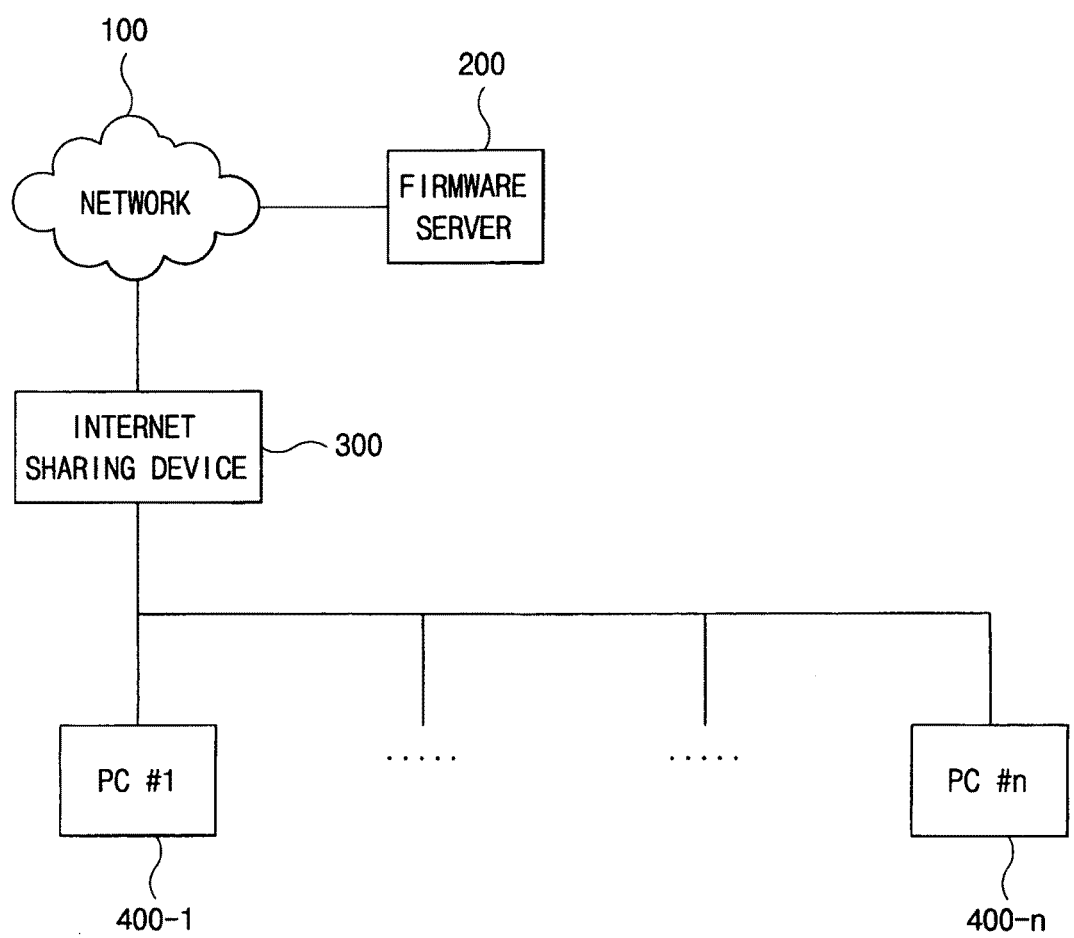
FIG. 1 is a block diagram illustrating the configuration of a network system having an internet sharing device according to an embodiment of the present invention.
Figure 2:
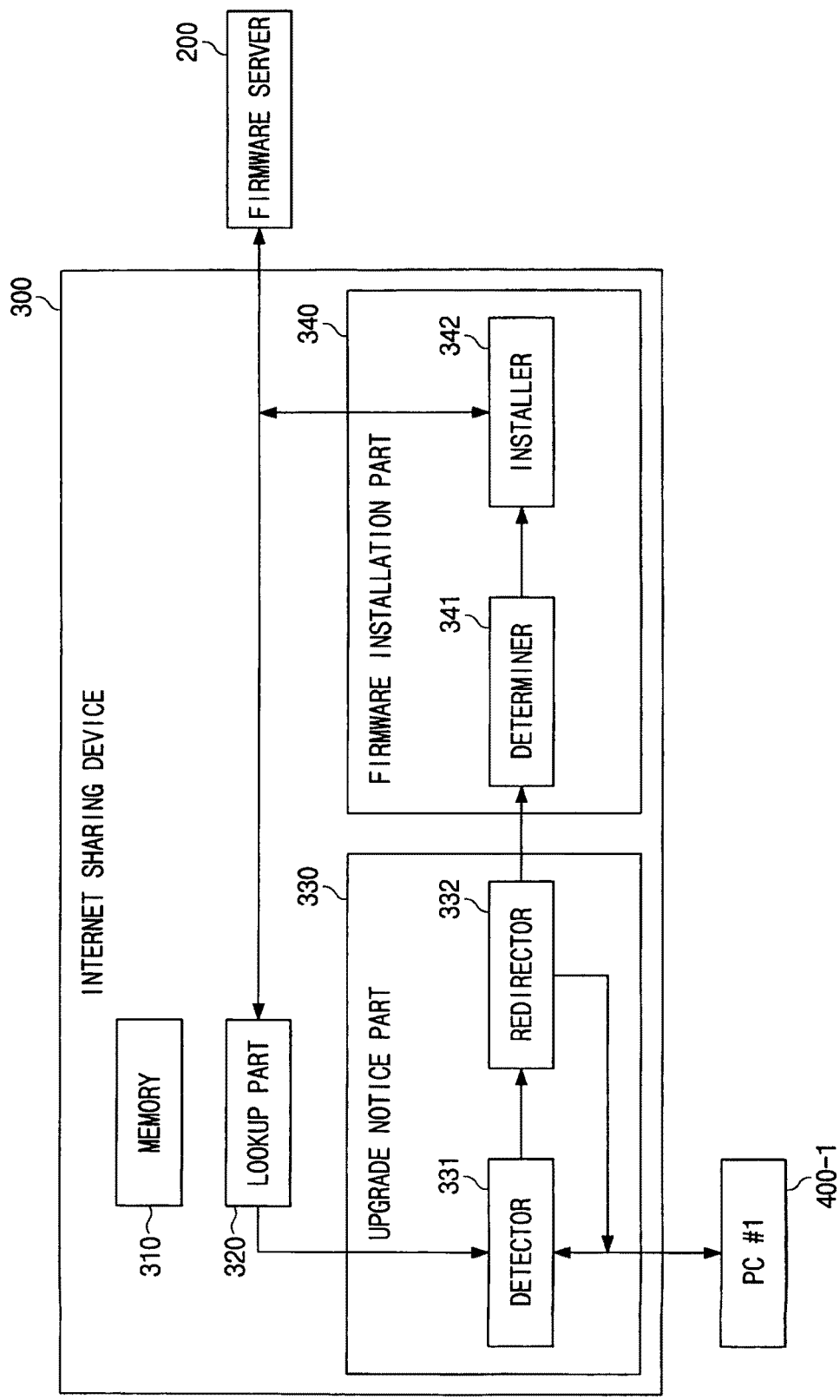
FIG. 2 is a block diagram illustrating the simple configuration of an internet sharing device according to an embodiment of the present invention.

FIG. 1 is a block diagram illustrating the configuration of a network system having an internet sharing device according to an embodiment of the present invention. FIG. 2 is a block diagram illustrating the simple configuration of an internet sharing device according to an embodiment of the present invention.

Referring to FIG. 1, the internet sharing device 300 interworks with a network (e.g., a Local Area Network (LAN)) 100 through a communication line, and with one or more terminals (e.g., personal computers) 400-1 through 400-*n* through a wired or wireless communication line.

At this time, the network 100 interworks with a firmware server 200 that provides firmware to be installed on the internet sharing device. Here, the firmware server 200 can be operated by each or all of manufacturers of the sharing device.

As illustrated in FIG. 2, the internet sharing device 300 includes a memory 310 for storing firmware, information regarding a version of the firmware, and information regarding access of the firmware server 200. The internet sharing device 300 includes a lookup part 320 for getting access to the firmware server 200 at predetermined periods. The lookup part 320 also looks up a new version of firmware to be installed. The internet sharing device 300 includes an upgrade notice part 330 for giving notice of firmware upgrade to the terminal attempting to access the Internet. The internet sharing device 300 includes a firmware installation part 340 for downloading and installing the new version of firmware from the firmware server 200.

First, the lookup part 320 gets access to the firmware server 200 at predetermined periods (e.g., six months) using the version information of the firmware and the access information of the firmware server 200 which are stored in the memory 310. The lookup part 320 looks up a new version of firmware to be upgraded.

In detail, the lookup part 320 downloads a list of the firmware from the firmware server 200. Then, the lookup part 320 looks up whether or not any version of the downloaded firmware is higher than a version of the installed firmware.

The upgrade notice part 330 gives notice of a firmware upgrade to the terminal attempting to access the Internet when the new version of firmware is looked up by the lookup part 320.

The upgrade notice part 330 includes a detector 331 detecting a user (e.g., terminal 400-1) attempting to access the Internet from among the currently interworking terminals 400-1 through 400-*n*. The upgrade notice part 330 includes a redirector 332 for redirecting a webpage giving notice of the firmware upgrade to an internet access page of the detected terminal.

Figure 3:
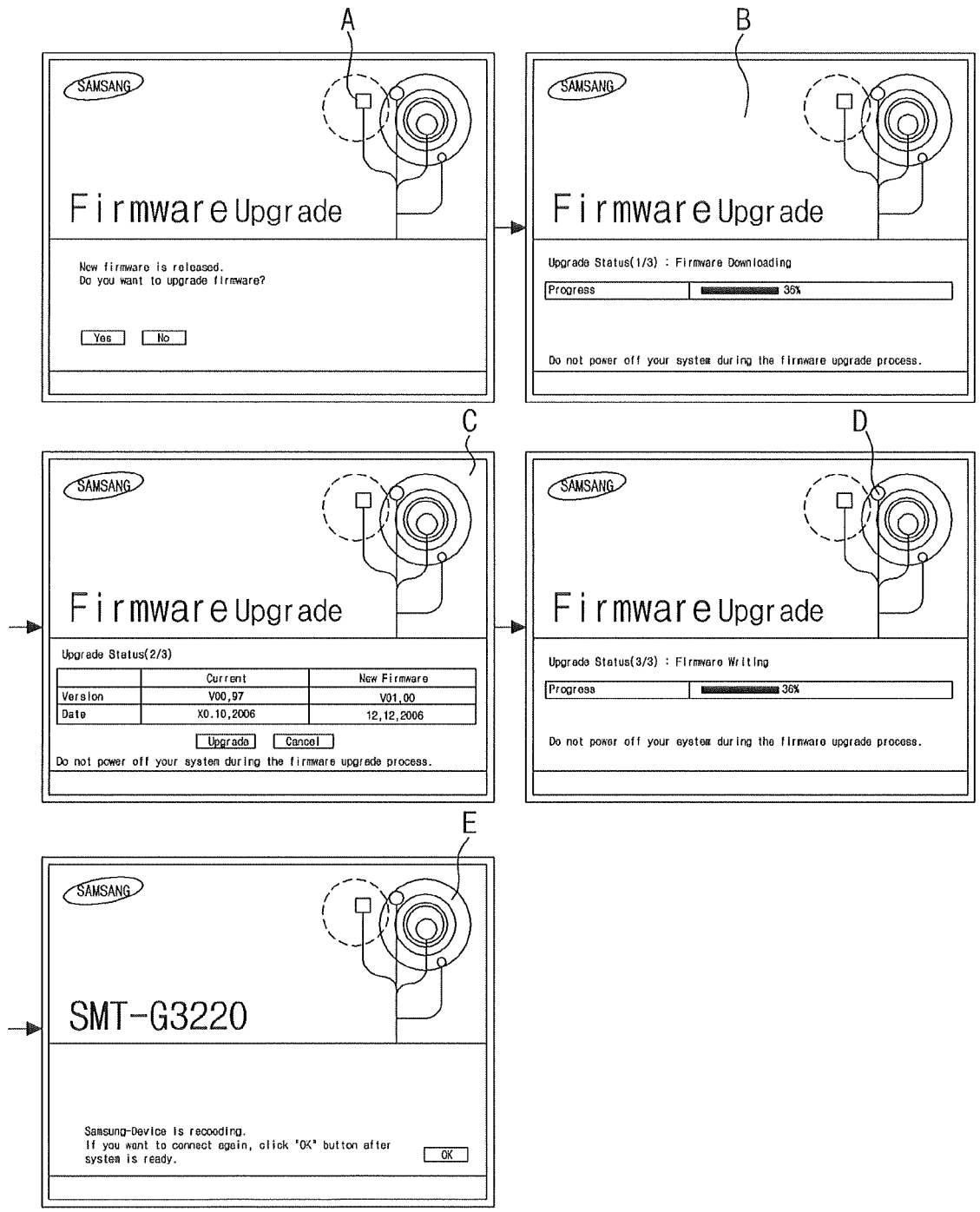
FIG. 3 illustrates screens of an exemplary terminal illustrated in FIG. 1.

Here, the webpage giving notice of the firmware upgrade can be realized such as a screen A as illustrated in FIG. 3. As a result of the redirection, and the webpage is displayed on a screen of the terminal instead of the internet access page (e.g., Yahoo) to which an arbitrary terminal attempts to get access.

The firmware installation part 340 downloads and installs a new version of firmware from the firmware server 200 when the firmware upgrade is requested through the webpage redirected by the redirector 332.

The firmware installation part 340 includes a determiner 341 for determining whether or not the firmware upgrade is requested from the corresponding terminal 400-1. The firmware installation part 340 also includes an installer 342 for getting access to the firmware server 200, and downloading and installing the new version of firmware.

Particularly, the installer 342 is carried out when the determiner 341 determines that the firmware upgrade is requested. According to an embodiment of the present invention, the installer 342 can be realized by, but not limited to, downloading the new version of firmware, and displaying information about the new version of firmware (e.g., version and safety description) on the corresponding webpage.

Here, the webpage, on which the information about the new version of firmware is displayed, can be realized such as a screen C as illustrated in FIG. 3. The webpage includes two buttons, one of which is an OK button instructing installation of the downloaded firmware, and the other is a Cancel button instructing cancellation of the installation of the downloaded firmware. Thus, a user reads the information about the new version of firmware and can consent or cancel the installation of the new version of firmware.

Figure 4:
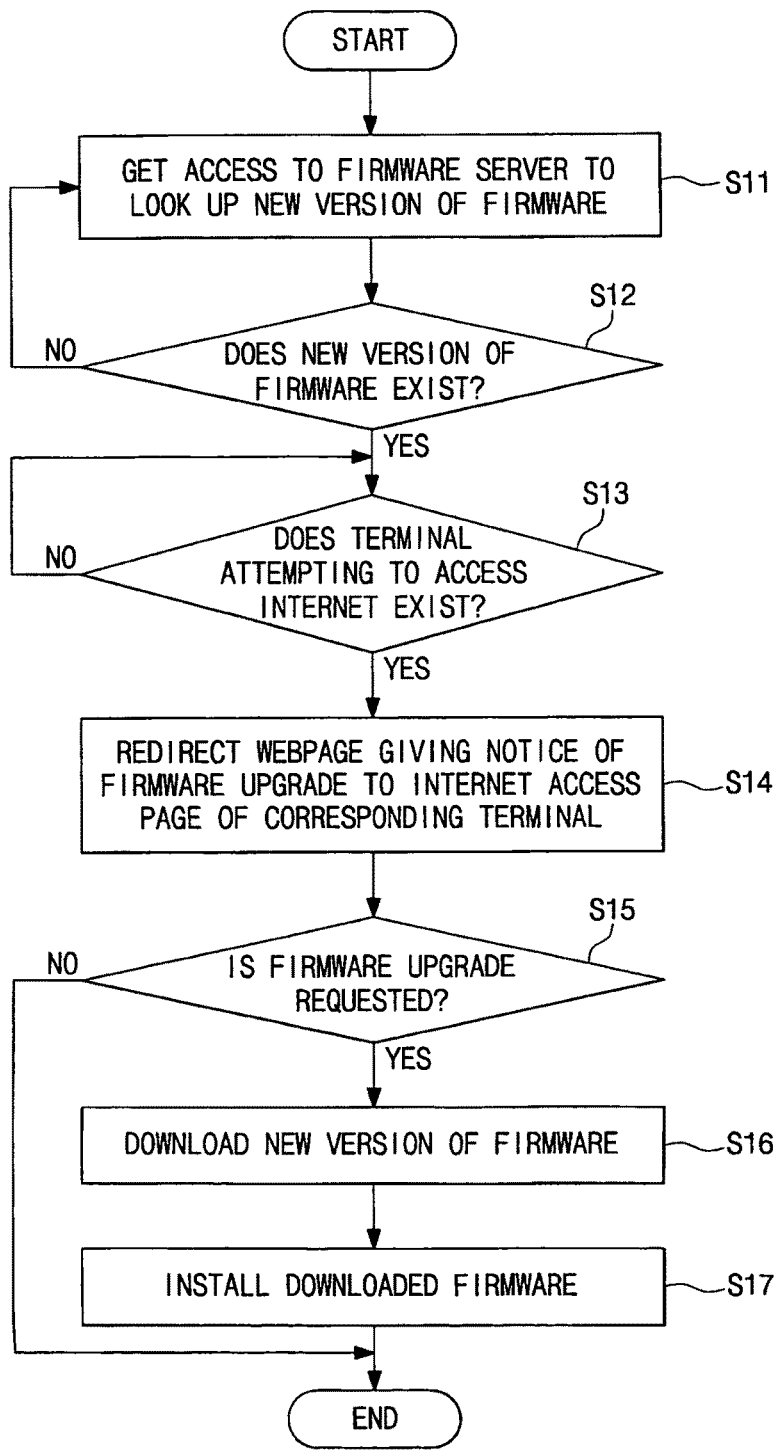
FIG. 4 is a flow chart illustrating the operation of an internet sharing device according to an embodiment of the present invention.

FIG. 4 is a flow chart illustrating the operation of an internet sharing device according to an embodiment of the present invention.

First, the lookup part 320 gets access to the firmware server 200 at predetermined periods, and looks up a new version of firmware (e.g., higher than a version of the installed firmware) in step S11.

Also, the lookup part 320 checks whether or not the new version of firmware exists in step S12.

As a result of the checking of step S12, if the new version of firmware exists, the detector 331 detects whether or not a user attempting to access the Internet from among the interworking terminals exists in step S13.

As a result of the detection of step S13, if the user attempting to access the Internet from among the interworking terminals exists, the redirector 332 redirects a webpage (e.g., screen A of FIG. 3) giving notice of the firmware upgrade to an internet access page of the detected terminal in step S14.

Next, the determiner 341 determines whether or not the firmware upgrade is requested through the corresponding webpage (screen A of FIG. 3) in step S15.

If it is determined, in step S15, that the firmware upgrade is requested, the installer 342 downloads the new version of firmware from the firmware server 200 in step S16. At this time, the downloading process can be displayed on a screen of the terminal such as a screen B of FIG. 3.

Subsequently, the installer 342 installs the downloaded firmware on the memory 310, and then performs rebooting in step S17.

At this time, the installing process can be displayed on the screen of the terminal such as screen C of FIG. 3 (e.g., a webpage showing the current version of the existing firmware and the new version of the downloaded firmware), a screen D (e.g., a webpage showing the installing process), and a screen E (e.g., a webpage informing completion of the installation).

For example, the redirector 332 can be realized so as to redirect the webpage on which the information about the new version of firmware looked up is displayed. At this time, since a point of time when the new version of firmware is looked up by the lookup part 320 can differ from a point of time when the terminal gets access to the Internet, the redirector 332 requests the lookup part 320 to look up the new version of firmware again. The redirector 332 displays the information about the new version of firmware looked up on the corresponding webpage, and redirects the corresponding webpage.

Accordingly, the user can fully read the information about the new version of firmware in advance prior to downloading the new version of firmware. Then, the user can determine whether or not to upgrade the firmware.

Meanwhile, according to an embodiment of the present invention, the lookup part 320 is realized so as to get access to the firmware server 200 at predetermined periods and to look up the new version of firmware. However, the lookup part 320 is not limited to this configuration. Thus, the lookup part 320 can be carried out by the lookup instruction of an arbitrary terminal, an external button of the internet sharing device, and the like.

Further, according to an embodiment of the present invention, the detector 331 is realized so as to detect a user attempting to access the Internet from among the currently interworking terminals. However, the detector 331 is not limited to this configuration. For example, the detector 331 may be realized so as to determine whether the terminal attempting to access the Internet belongs to a terminal corresponding to a manager.

In this case, the terminal corresponding to a manager determines whether to upgrade the internet sharing device and then upgrades the internet sharing device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for upgrading firmware on an internet sharing device, the apparatus comprising:
    a memory, in the internet sharing device, configured to store firmware for the internet sharing device and to store access information for a firmware server;
    a lookup part, in the internet sharing device, configured to access the firmware server using the access information stored in the memory, to look up a version of the firmware in the firmware server, and to determine whether the version of the firmware in the firmware server is new based on a comparison to a version of the firmware stored in the memory; and
    an upgrade notice part, in the internet sharing device, configured to detect a terminal attempting to access an internet access page on the Internet via the internet sharing device and to redirect the terminal to a webpage giving notice of a firmware upgrade in response to detecting the terminal attempting to access the internet access page and identifying that the lookup part determined that the version of the firmware in the firmware server is new.

2. The apparatus according to claim 1, further comprising a firmware installation part configured to download a new version of the firmware from the firmware server and install the new version of the firmware on the internet sharing device in response to a request for the firmware upgrade received from the terminal.

3. The apparatus according to claim 2, wherein the firmware installation part comprises:
    a determiner configured to determine whether or not the firmware upgrade is requested by the terminal; and
    an installer configured to download the new version of the firmware from the firmware server and install the new version of the firmware on the internet sharing device in response to the determiner determining that the firmware upgrade is requested by the terminal.

4. The apparatus according to claim 3, wherein the installer is further configured to give notice of information about the new version of the firmware downloaded to the terminal and receive an instruction to install the new version of the firmware from the terminal.

5. The apparatus according to claim 1, wherein the upgrade notice part comprises:
   a detector configured to detect the terminal attempting to access the internet access page on the Internet; and
   a redirector configured to redirect the terminal to the webpage giving the notice of the firmware upgrade.

6. The apparatus according to claim 5, wherein the detector is further configured to detect whether or not the detected terminal is a terminal for a manager.

7. The apparatus according to claim 5, wherein the redirector is further configured to display information about the new version of the firmware on the webpage.

8. A method for upgrading firmware on an internet sharing device, comprising:
   storing, in the internet sharing device, firmware for the internet sharing device;
   accessing, with the internet sharing device, a firmware server, the firmware server providing a new version of the firmware;
   looking up, with the internet sharing device, whether or not the new version of the firmware exists based on a comparison to a version of the firmware stored in the internet sharing device;
   detecting a terminal attempting to access an internet access page on the Internet via the internet sharing device;
   in response to detecting the terminal attempting to access the internet access page and identifying that the new version of the firmware exists, redirecting the terminal to a webpage giving notice; and
   downloading and installing, with the internet sharing device, the new version of the firmware from the firmware server when the firmware upgrade is requested by the terminal.

9. The method according to claim 8, wherein giving notice of the firmware upgrade comprises:
   sending a request to the terminal for approval to upgrade the firmware of the internet sharing device.

10. The method according to claim 9, further comprising detecting whether the detected terminal has authority as a manager.

11. The method according to claim 9, wherein redirecting comprises: displaying information, on the webpage, about the new version of the firmware.

12. The method according to claim 9, wherein installing the new version of the firmware comprises:
   determining, through the webpage, whether the firmware upgrade is requested; and
   when the firmware upgrade is requested, accessing the firmware server to download the new version of the firmware, installing the downloaded firmware, and rebooting the internet sharing device.

13. The method according to claim 12, wherein installing the downloaded firmware includes sending display information about the downloaded firmware to the terminal and receiving an instruction for installing the firmware from the terminal.

14. A system for upgrading firmware from the Internet, the system comprising:
   a plurality of terminals interworking with an internet sharing device, wherein at least one terminal is configured to access the Internet via the internet sharing device; and
   the internet sharing device, the internet sharing device comprising:
   a memory configured to store firmware for the internet sharing device and to store access information for a firmware server;
   a lookup part configured to access the firmware server using the access information stored in the memory, to look up a version of the firmware in the firmware server, and to determine whether the version of the firmware in the firmware server is new based on a comparison to a version of the firmware stored in the memory; and
   an upgrade notice part configured to detect the at least one terminal attempting to access an internet access page on the Internet via the internet sharing device and to redirect the terminal to a webpage giving notice of a firmware upgrade in response to detecting the at least one terminal attempting to access the internet access page and identifying that the lookup part determined that the version of the firmware in the firmware server is new.

15. The system according to claim 14, wherein the internet sharing device further comprises a firmware installation part configured to download new version of the firmware from the firmware server and install the new version of the firmware on the internet sharing device in response to a request for the firmware upgrade received from the terminal.

16. The system according to claim 15, wherein the firmware installation part comprises:
   a determiner configured to determine whether or not the firmware upgrade is requested by the terminal; and
   an installer configured to download the new version of the firmware from the firmware server and install the new version of the firmware on the internet sharing device in response to the determiner determining that the firmware upgrade is requested by the terminal.

17. The system according to claim 16, wherein the installer is further configured to give notice of information about the new version of the firmware downloaded to the terminal and receive an instruction to install the new version of the firmware from the terminal.

18. The system according to claim 14, wherein the upgrade notice part comprises:
   a detector configured to detect the terminal attempting to access the internet access page on the Internet; and
   a redirector configured to redirect the terminal to the webpage giving the notice of the firmware upgrade.

19. The system according to claim 18, wherein the detector is further configured to detect whether or not the detected terminal is a terminal for a manager.

20. The system according to claim 18, wherein the redirector is further configured to display information about the new version of the firmware on the webpage.

* * * * *